United States Patent [19]
Savit

[11] 3,968,471
[45] July 6, 1976

[54] METHOD FOR SUPPRESSING SIDE LOBES IN CORRELATION PROCESSES

[75] Inventor: Carl H. Savit, Houston, Tex.

[73] Assignee: Western Geophysical Company of America, Houston, Tex.

[22] Filed: Nov. 10, 1972

[21] Appl. No.: 305,623

Related U.S. Application Data

[63] Continuation-in-part of Ser. No. 218,284, Jan. 17, 1972, Pat. No. 3,863,058.

[52] U.S. Cl. ................ 340/15.5 CC; 340/15.5 DP; 324/77 G; 324/77 J; 235/156
[51] Int. Cl.² ...................... G01V 1/28; G01V 1/36
[58] Field of Search ............ 340/15.5 CC, 15.5 DP; 235/152, 156, 181; 324/77 G, 77 J

[56] References Cited
UNITED STATES PATENTS

| | | |
|---|---|---|
| 2,688,124 | 8/1954 | Doty et al .................... 340/15.5 TA |
| 3,108,249 | 10/1963 | Clement ....................... 340/15.5 SC |
| 3,449,553 | 6/1969 | Swan ............................... 235/152 X |
| 3,536,903 | 10/1970 | Goshorn et al. ..................... 235/168 |
| 3,697,938 | 10/1972 | Taner .......................... 340/15.5 CC |
| 3,731,268 | 5/1973 | Landrum ..................... 340/15.5 TA |

*Primary Examiner*—Nelson Moskowitz
*Attorney, Agent, or Firm*—William A. Knox

[57] ABSTRACT

This invention relates to an improved method of seismograph exploration by means of time-variant oscillatory signals whereby the side lobes of the correlograms (or of the output waveforms) are randomized to prevent constructive reinforcement during vertical or horizontal stacking. The randomization is effected by using an approximate or inexact method of correlation or convolution or by admixing random (or white) noise into the correlation process.

21 Claims, 2 Drawing Figures

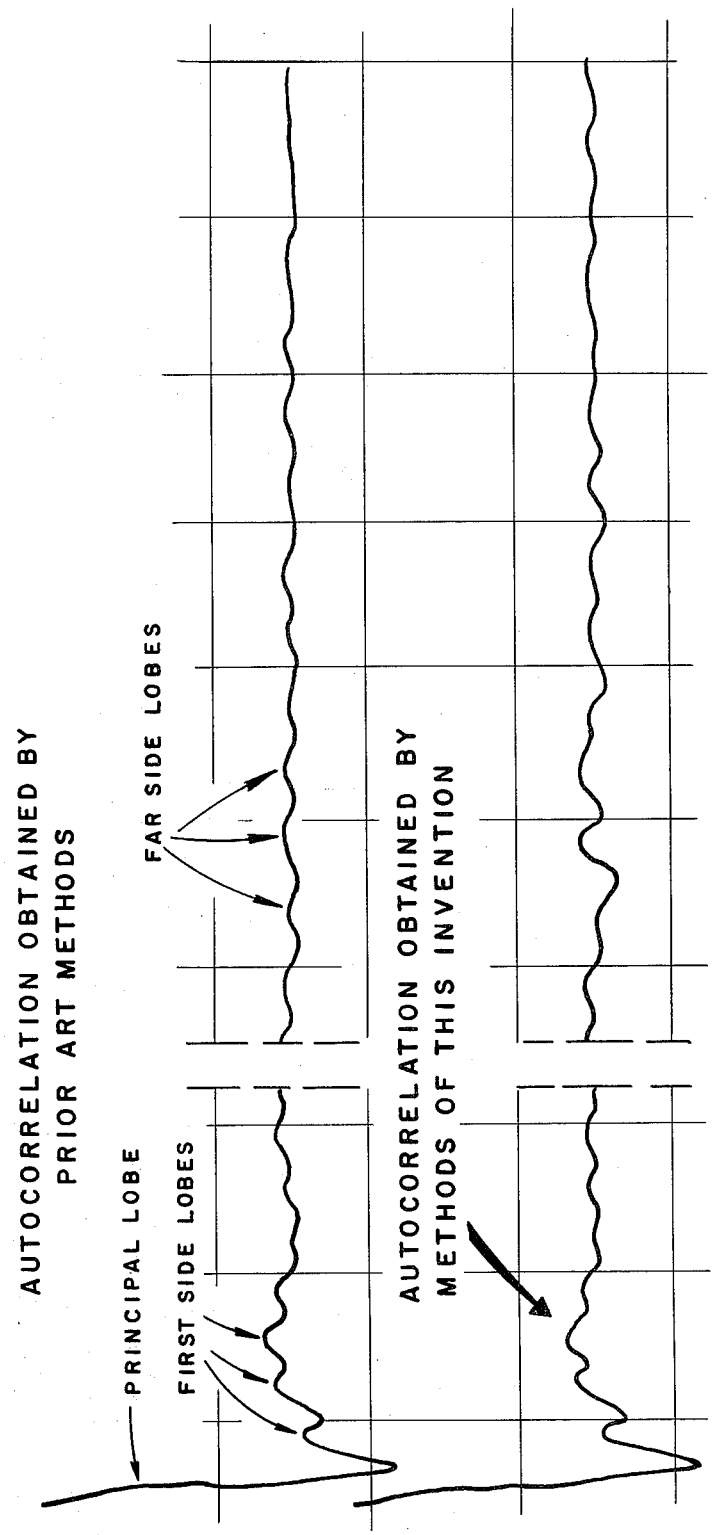

METHOD FOR SUPPRESSING SIDE LOBES IN CORRELATION PROCESSES

CROSS-REFERENCE TO RELATED APPLICATION

This application is a continuation-in-part of my co-pending application Ser. No. 218,284 filed Jan. 17, 1972, assigned to the same assignee, and now U.S. Pat. No. 3,863,058.

BACKGROUND OF THE INVENTION

In seismic exploration, a seismic energy-source transducer injects a seismic signal into the earth. The signal travels downwardly and becomes reflected from subsurface formations. The reflected signal returns to the surface of the earth where it is detected by sensitive geophones which convert the reflected seismic signals to electrical signals and transmit the signals to a signal utilization device. The traveltime delay between the time of injection of the original seismic signal and the time of reception of the reflected signals by the geophones is a function of the depth of the respective formations. Typically, a maximum reflection-time delay on the order of several seconds is expected, while reflections from shallower formations will arrive proportionately sooner.

In one method of seismic exploration, the seismic energy source transducer produces a sweep signal. The sweep signal is a unique wave train that is nonrepetitive during a period which is at least as long as the maximum traveltime delay. The sweep-signal wave train will be reflected from several subsurface formations. Seismic signals received by the geophones will be a complex wave train containing successively overlapping images of the original sweep signal. The beginning of each of the overlapping images will be shifted in time from the instant of initiation of the sweep signal in proportion to the vertical depth of the formations.

Useful information from the complex, reflected wave train is obtained by serially correlating that wave train with a replica of the original sweep signal. From the results of serial correlation, a correlogram can be constructed. The time delays to successive correlogram peaks are functions of the depths of each reflector. Methods and apparatus for practicing this technique of seismic exploration are very well known to the art; see for example, U.S. Pat. No. 2,688,124.

Generally, reflection signals produced by the use of such sweep signals are so weak that many must be added together to produce a legible product. It is also commonplace to effect much of the adding process in the field to avoid the expense of separately recording and storing the result of the application of each individual sweep signal. Correlation in the prior art has customarily taken place after the so-called "vertical" summing and prior to the so-called "horizontal" summing.

Side lobes, especially those attendant upon refraction signals and upon particularly strong reflection signals, were an unwelcome by-product of the correlation process. The side lobes were added in phase (i.e., coherently) by the vertical stacking process and at least in part by the horizontal stacking process.

It has long been recognized that it would be desirable to effect correlation before all of the adding or stacking processes, if an adequate field correlator could be made available and if the side lobes could somehow be suppressed. Unfortunately, in the prior art the only recognized but uneconomical method of suppressing side lobes was to increase the length of the operator.

Seismic data are customarily expressed, recorded, and manipulated as binary numbers with a typical resolution of 15 bits plus a sign bit. A typical reflected time series may have a 24-second duration and a 4ms sample rate. Therefore, a conventional field correlator may require storage for 6000 16-bit data samples for the reflected data. A memory for 3000 16-bit samples may be needed to store the original 12-second sweep signal, and an additional 3000 32-bit locations may be needed as a buffer storage for the integrated cross products. It is apparent, therefore, that a tremendous amount of bulk digital storage is needed to handle the correlation computations.

Large digital computers equipped with array processors, such as are found in a central data-processing center, can handle serial-correlation problems without difficulty. For a field correlator, however, the physical size of the required bulk storage, the expense of the hardware, and field time lost in making the computations requiring manipulation of 16- and 32- bit numbers render present state-of-the-art field correlators either complicated, expensive, or very slow. Alternative prior-art field correlators use crude approximations, typically only 4 or 8 bits of the 16-bit seismic and sweep-data words, in order to reduce the storage requirements. But, the resulting correlograms lack resolution.

Approximation by use of such truncated data words is of the so-called constant absolute error type. It is damaging to the resulting, desired, output signals and severely restricts the dynamic range of the entire seismograph record. What was needed was a method of approximation with a constant relative error so as to be useful over the entire dynamic range of seismograph signals.

Seismic data are recorded on magnetic tape in the field as digital, floating-point, computer-compatible numbers. A floating-point number includes an algebraic sign, an exponent to a selected number base, and a mantissa. Before these numbers can be processed by conventional field correlators, it is necessary to normalize the floating-point numbers to fixed-point binary integers. The hardware needed for such normalization is complicated and expensive; furthermore, the field-correlator's computation-time is necessarily increased.

There is a need, therefore, for a fast serial correlation method for field use that will be of constant relative error type, that requires inexpensive, compact hardware, that reduces the size of the required data-storage capacity, simplifies the arithmetic, and eliminates the need for conversion of floating-point numbers to integers.

SUMMARY OF THE INVENTION

In a broad aspect of this invention two continuous oscillatory signals are sampled at preselected intervals and the samples are converted to floating-point numbers formatted in a preselected bit pattern. The exponents of the floating-point numbers are then adjusted to cause the mantissas of the samples to lie within a narrow numerical range, close to unity. As each signal varies, therefore, the mantissa remains substantially constant while the exponent varies to track variations in the signal's amplitude. Hence, two time series or number sequences whose elements are samples of an oscillatory electrical signal can be serially-correlated by arithmetically manipulating the exponents and algebraic signs, instead of the actual data values. Thus, neglecting the mantissas in the computations is equivalent to assuming that all mantissas are equal to one, i.e., the method of the present invention effectively makes all mantissas substantially equal to unity.

In a specific embodiment of this invention, the absolute values of the exponents of each of the corresponding elements or component values from the two time series are first added. The sums are then exponentiated to the original floating-point number base. Algebraic signs (polarities) of the original sample values are multiplied and their product is applied to the respective exponentiated sums. The exponentiated, signed sums, or exponentials are then algebraically added to compute the covariance or correlation values.

This invention therefore provides a rapid field correlation method that requires a minimal amount of digital storage and hardware and requires only the elementary arithmetic operations of adding, shifting, comparing, and complementing. It also provides a method of correlation or convolution which can randomize the side lobes of the correlated or convolved waveform without substantially increasing the lobes' average or root mean square amplitude, and without materially degrading the magnitude or value of the principal lobe of the correlated or convolved waveform.

BRIEF DESCRIPTION OF THE DRAWING

FIG. 2 is a comparison of the principal lobe and of the first and far side lobes of an autocorrelation computed by known means with the corresponding autocorrelation computed by the method of this invention.

DETAILED DESCRIPTION OF THE INVENTION

Figure 1:
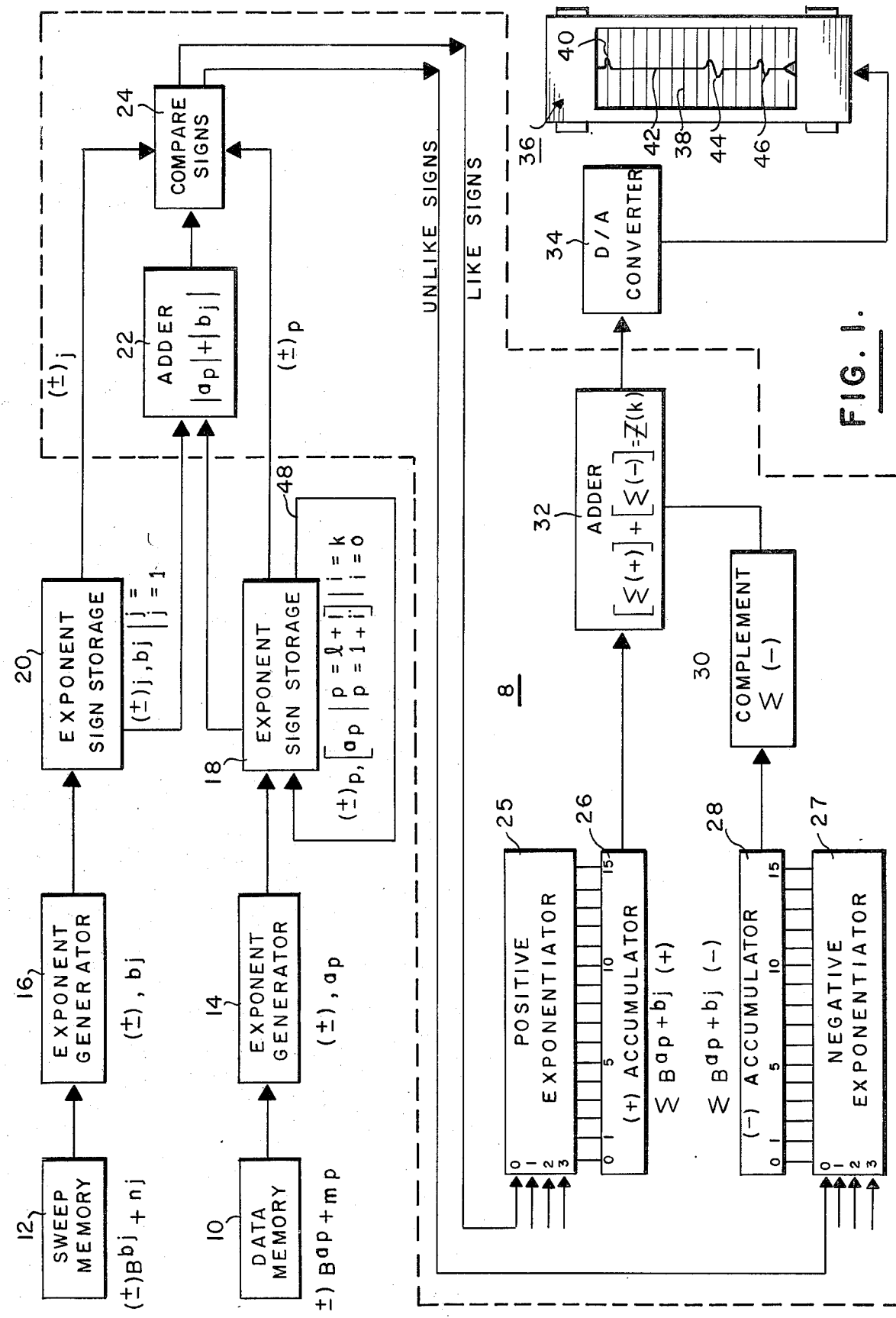
FIG. 1 is a preferred correlator for use in practicing the method of this invention.

Serial-correlation of two time series may be better understood from a brief mathematical review. For example, let two continuous oscillatory electrical signals, such as a reflected wave train and a sweep signal, be sampled at preselected time intervals. Let the voltage level of each sample be converted to a digital number representative of the magnitude thereof and then tabulated as in Table 1 in an order array to form two discrete time-series having $l+k$ and $l$ elements respectively. Typical elements $x_p$ and $y_j$ of the two series may be expressed as binary integers.

TABLE 1

| Reflected Signal | Sweep Signal |
|---|---|
| $x_1$ | $y_1$ |
| $x_2$ | $y_2$ |
| $x_3$ | $y_3$ |
| $x_4$ | . |
| $x_5$ | . |
| $x_6$ | $y_j$ |
| . | . |
| . | . |
| $x_j$ | $y_l$ |
| . | |
| . | |
| $x_p$ | |
| . | |
| . | |
| $x_{l+k}$ | | where $p=i+j$ ( $i$ = phase ) ( $j$ = running index. )

The covariances $Z(k)$ are computed from:

$$x_1 y_1 + x_2 y_2 + x_3 y_3 +...+ x_l y_l = Z(0) \quad (1)$$
$$x_2 y_1 + x_3 y_2 + x_4 y_3 +...+ x_{l+1} y_l = Z(1) \quad (2)$$
$$x_3 y_1 + x_4 y_2 + x_5 y_3 +...= x_{l+2} y_l = Z(2) \quad (3)$$

$$x_k y_1 + x_{k+1} y_2 + x_{k+2} y_3 +...+ x_{l+k} y_l = Z(k),$$

or in general:

$$\sum_{j=1}^{l} x_p + y_j = Z(i) \quad (i = 0,1,2,...k). \quad (4)$$

A high numerical value of $Z(i)$ at the $i^{th}$ interval implies a high degree of association between the two time series at the time corresponding to the $i^{th}$ sample.

Running index $i$ may be defined as the phase lag between the corresponding elements or data samples forming the two time series. If $i=0$, there is no relative displacement between corresponding elements of the two series; if $i=1$, there is a one-element relative displacement between the corresponding elements of the two time series. It follows, assuming the original continuous signals to be sampled at 0.004-second intervals, that if $i=4$, the phase lag or displacement between the two series is 16 milliseconds or 4 sample intervals.

Sampling of the two continuous oscillatory signals is commenced at the instant of initiation of the sweep signal. Hence $i$, when multiplied by the sample-interval time, is the time elapsed since initiation of the sweep signal. A graph of $Z(i)$, plotted as a function of the phase lag $i$ (i.e., as function of time), yields a correlogram whose peaks may be, for example, indicative of the arrival times of reflected seismic wave trains.

Those skilled in the mathematical art will recognize that the values of $Z(i)$ are the inner products (dot products) of the vectors $x_j$ ($j = i+1$ to $j = i+l$) and $y_j$ ($j = 1$ to $j = l$). Thus, the present invention may be used generally in all instances in which an inner product of vectors is required. The mathematics of serial correlation are discussed more fully in the "Handbook of Probability and Statistics," Burlington and May Handbook Publishers, Inc., Sandusky, Ohio, 1958.

Seismic data are typically recorded in the field on magnetic tape as digital floating-point numbers consisting of a sign, a mantissa, and an exponent of a preselected base. Binary-integer values for $x_p$ (where $p=i+j$) and $y_j$ may be expressed in floating-point form as $$x_p \equiv (\pm) B^{a_p} \times m_p$$
$$y_j \equiv (\pm) B^{b_j} \times n_j$$

where $m_p$ and $n_j$ are mantissas having a value near to 1, B is a number-system base such as 2, 8, 16, or other base, and $a_p$ and $b_j$ are the exponents. Prior to recording on tape, the $m_p$ and $n_j$ were constrained to remain within a narrow numerical range close to unity. For the purposes of this invention the $m_p$ and $n_j$ may be considered to be constants. As long as the mantissas remain substantially constant, variations in $x_p$ and $y_j$ will be represented by variations in the values of $B^{a_p}$ and $B^{b_j}$.

Thus, the cross products of equation (4) can be computed by adding the absolute values of the exponents and by exponentiating the resulting sums to form an exponential. The data-sample signs of the respective time-series are separately multiplied and applied to the exponentials to form the signed cross-products, as by means of a sign comparator. If a pair of data signs are alike, the exponentials are transferred to a positive accumulator or integrator; if the signs are unlike, the exponentials are transferred to a negative accumulator, or integrator. When all of the exponents have been summed, exponentiated, and accumulated, the contents of the two accumulators are added to compute a covariance value $Z(i)$.

Thus, if B is assigned the value 2, the value for $Z(0)$ in equation (1) is computed from $$Z(0) = \{sgn(x_1)\ sgn(y_1)\}\ 2^{a_1 + b_1} + \{sgn(x_2)\ sgn(y_2)\}2^{a_2 + b_2} + \{sgn(x_3)\ sgn(y_3)\}2^{a_3 + b_3} + \ldots + \{sgn(x_p)\ sgn(y_q)\}\ 2^{a_p \pm b_q} \quad (5)$$

where the expressions in braces symbolize the cross-multiplied signs of the respective data values.

A better understanding of the method of this invention may be gained by study of numerical examples from Table 2. Assume floating-point values for the first three terms of the $x_p$ and $y_j$ to be

TABLE 2

| p, j | x | y |
|---|---|---|
| 1 | $-(2^5 \times c)$ | $-(2^2 \times c)$ |
| 2 | $+(2^6 \times c)$ | $-(2^5 \times c)$ |
| 3 | $-(2^0 \times c)$ | $+(2^4 \times c)$ | where $c$ is a substantially constant mantissa whose value is approximately one and which will be ignored.

In a preferred embodiment of this invention, the decimal exponents in Table 2 are expressed as binary integers which may be summed in a simple 4-bit adder. Signs of the respective data values are cross-multiplied as in Table 3.

TABLE 3

| sgn(x) | a | sgn(y) | b | sgn(x).sgn(y) | a+b |
|---|---|---|---|---|---|
| − | 0101 | − | 0010 | + | 0111 |
| + | 0110 | − | 0101 | − | 1011 |
| − | 0001 | + | 0100 | − | 0101 |

The summed exponents are then exponentiated; that is, the base 2 is raised to the power indicated by the summed exponents. The cross-multiplied signs are applied to the exponentiated sums and the resulting terms are integrated to form the sum of the products Z of the original series. Exponentiation and integration of the data from Table 3 are illustrated below, assuming use of a 16-bit accumulator for integration and two's complement notation for negative numbers:

```
          0000000010000000
          1111000000000000
          1111111111000000
  Z(0)    1111000001000000
```

In decimal notation, the binary value of $Z(0)$ is −4032. This number, for example, may represent digitally a certain fraction of a full-scale analog voltage. Using 10-volt logic and a 16-bit digital-to-analog converter, the number −4032 represents −2.5 volts.

From this brief mathematical discussion it is clear that serial correlation of two discrete time-series can be accomplished by addition, exponentiation, and integration without recourse to multiplication. All of the operations can be performed by means of adders, decoders, accumulators, and comparators. It is now possible to build a simple field correlator requiring only inexpensive components and minimal storage.

Seismic data ranges are such that floating-point exponents can be expressed by 4-bit binary numbers. Thus storage requirements for data and sweep arrays are reduced by three-fourths as compared to conventional 16-bit fixed point data. Since the seismic data samples, in present day seismic field instruments, are determined as floating-point numbers having substantially constant mantissas, which are transmitted to a recording unit for storage on an archival-storage medium such as magnetic tape, it is a simple matter to intercept or to play back only the data signs and exponents for direct use.

The correlations computed by means of the present invention will not be exact since the individual values to be correlated are expressed as rather crude approximations. For example, setting all mantissas to the value of one may produce an error in a single sample of 2 to 1. Some additional precision may be obtained by rounding rather than truncating. For example, truncating when using base 2 means constraining the multiplicative error to fall within a limited range lying between $\frac{1}{2}\sqrt{2}$ and $\sqrt{2}$. An intermediate rounding may be achieved by constraining the multiplicative error to lie in the limited range between ¾ and 1½. The limiting range of approximation of all these cases is, of course, two-to-one.

When, however, such approximations are used in calculating the correlations of the very long signals involving many thousand samples such as are customary in seismograph prospecting, it has been found that the error of the correlogram is about 1½ percent of the central value (i.e., of the amplitude of the principal lobe), a value that is of the same order of magnitude as the larger side lobes.

In FIG. 2 a comparison of the principal lobes of an exactly computed autocorrelation with the approximation of this invention discloses no visible difference in wave-form since a 1½% error is not detectable at the scale of the figure. The far side lobes on an expanded scale are seen to be grossly different. Since the error so produced is a function of sampling parameters, it is independent of the waveform. This error thus randomizes the side lobes of the correlogram and the correlograms of different data traces will not be coherent as to side lobes. Subsequent summing of such correlograms will serve further to reduce the level of side lobes relative to background noise approximately as $\sqrt{n}$ where n is the number of correlograms summed.

It is further to be noted that although the 1½% error in the correlograms is typically to be expected for the customary seven-second sweep-signal, the error will be larger for shorter sweeps and less for longer sweeps. Similarly, the side lobes will be larger for shorter sweep signals and smaller for longer signals. Thus the approximation of this invention will normally produce randomization of about the same magnitude as that of the side lobe regardless of sweep length.

An alternative method of practicing the present invention is to introduce random noise (or white light) into the correlation process. The random noise can be produced by a random noise generator, or it can be derived from a table of random numbers as is well known in the computer arts. Sets of random numbers are applied multiplicatively both to the pilot signal and to the data signal to be correlated with the pilot signal. The random numbers are squared so that their rootmean-square values will produce randomized side-lobe magnitudes on the resulting correlograms approximately equal to the values of accurately-computed side lobes. In a typical exploration seismograph, in which the sweep or pilot signal is about 2000 samples in length, RMS values of the noise should be of the order of 0.25. Alternatively, the random signals can be specified to have substantially the same range as the error of approximation in using powers of 2 to approximate the data, i.e., in setting the mantissas to the value of one.

Normally it will not be advantageous to practice this invention by admixing random signals as described in this alternative method because the computing apparatus and computing time required in the first method embodiment will be much less. However, when an existing correlator is available or when correlation is performed by means of the Fast Fourier Transform (FFT), it may be more convenient to admix random signals as described herein.

Referring now more specifically to FIG. 1, there is displayed a flow diagram of a preferred correlator for practicing the method of this invention.

There is shown a data-memory 10 and a sweep-memory 12. Data memory 10 may be a magnetic tape containing prerecorded seismic data which is expressed as a plurality of floating-point numbers forming the elements of a first, discrete, time series. Sweep-memory 12 may be a pre-recorded magnetic tape containing the sweep signal expressed as a second plurality of floating-point numbers which form the elements of a second discrete time series. Data-memory 10 may contain as many as 6,000 floating-point numbers or elements whose values are representative of the sampled amplitudes of a continuous, 24-second, seismic wave train. Ordinarily, sweep-memory 12 will contain approximately one half as many samples. Symbolically, the number of floating-point numbers or elements making up the first discrete time series may be expressed as K, while the number of elements in the second series is L. These figures are offered by wy of example and not to restrict the scope of this invvention.

Data-sample pairs from data-memory 10 and from sweep-memory 12 are transferred to exponent generators 14 and 16 where the signs of the data-values and the exponents $a_p$ and $b_j$ are stripped from the floating-point numbers. The signs and exponents are transferred to data-exponent storage 18 and to sweep-exponent storage 20. These respective signed exponents are stored in an order array corresponding to their respective positions in the original time-series representing the data. Each storage location for the $a_p$ and $b_j$ includes 5 bits. 4 bits are used to represent the numerical exponent value, the fifth bit is the sign bit for each sample.

A correlator, generally shown as 8 and enclosed by dashed lines, includes adder 22, sign comparator 24, exponentiators 25 and 27, accumulators 26 and 28, complementer 30 and adder 32.

After the data-exponent storage 18 and sweep-exponent storage 20 have been filled with the $a_p$ and $b_j$ respectively, the absolute values of a first pair of exponents $a_l$ and $b_l$ are respectively added together in adder 22. Simultaneously with the add-operation, the signs attached to $a_l$ and $b_1$ are compared in sign comparator 24. If the signs of the two values are alike, the contents of adder 22 are transferred to positive exponentiator 25. If the signs of the two values are unlike, the contents of adder 22 are transferred to negative exponentiator 27.

In a preferred embodiment, each of exponentiators 25 and 27 may be a 1-of-16 decoder such as a Fairchild 9311 chip. This decoder accepts a 4-bit input and produces 16 mutually exclusive outputs; the particular output depends on the combination of the four input bits. For example, if following the add operation, 4-bit adder 22 contained the bit combination 0101, a signal would appear on line 4 of one of the exponentiators 25 or 27. As explained previously, the choice depends upon the results of the data-sign comparison. If the selected base B is 2, the exponentiated sum or exponential would be $2^5$. Appearance of a signal on an output line of one of exponentiators 25 or 27 sets a corresponding bit in one of the 16-bit accumulators, either 26 or 28.

Next are added the absolute values of a second pair of exponents $a_2$ and $b_2$, their signs compared, the sum transferred to the appropriate exponentiators, and the exponential is integrated with previous data in the appropriate accumulator. The steps of addition, sign comparison, exponentiation, and accumulation or integration are repeated until all of the $a_p$ and $b_j$ have been processed.

The sum accumulated in accumulator 28 is now complemented in two's complement form and is added to the contents of accumulator 26 in adder 32 to compute a first covariance Z(O). Z(O) may be converted from a digital number to an analog voltage by a digital-to-analog converter 34 and then recorded as a first point on a correlogram 36.

Following computation of Z(O), the $a_p$ in data exponent storage 18 are shifted by one sample interval by shift-line 48. The shifted $a_p$ are now added to the unshifted $b_j$ in adder 22. The signs are similarly compared in sign conparator 24 and the output from adder 22 exponentiated in exponentiator 25 or 27 and the exponentials are integrated in accumulators 26 or 28. The second set of numbers is then added in adder 32 and displayed on correlogram 36 as a second value of covariance Z Z(1). The contents of data-exponent storage 18 are again shifted one interval and a third covariance value Z(2) is computed and displayed on correlogram 36. The complete process of addition, sign comparison, exponentiation, accumulation, final summation, display, and shifting is repeated (K-L) times and results in the serial correlation of the two discrete time series.

Normally, the correlogram values Z(i) will be stored in digital form on a suitable medium, as on magnetic tape. After further processing, as for example summing or stacking, they will be converted to visual form in a subsequent step.

On the visual representation of a correlogram 36, timing lines 38 mark equal time intervals, for example 0.050 second. The sweep initiation instant is recorded as a sharp peak 40 on correlgram-trace 42 by circuitry not shown. The elapsed times between the sweep initiation instant, marked by peak 40, and correlogram peaks 44 and 46, are the reflection delay times to two respective reflecting horizons.

Serial correlation of a single seismogram may require one half million operations involving adding, comparing, shifting, and exponentiating of binary numbers. In a typical field operation, such correlograms must be produced at intervals of 20 to 30 seconds. To be used as a field correlator before summing, the electronic components must have cycle times below the 100 nano-second range in order to produce useful correlograms in real time. It is apparent that mechanical or manual implementations of the serial-correlation process would be impracticable.

It is to be understood that the block diagram of FIG. 1 is intended to be illustrative of the basic principles of the invention. In actual implementation it may, for example, prove convenient to use but one exponentiator and to use time-sharing techniques to differentiate the positive and negative values. Similarly, the functions of the accumulators 26 and 28 and of adder 32 may be combined in one accumulator by inserting complementer 30 between negative exponentiator 27 and the combined accumulator-adder.

It will be apparent to those skilled in the art of reduction of geophysical data that the present invention is eually applicable to the application of all sorts of operators to geophysical data sequences. In particular, it may be applied to the deconvolution process, to numerical filtering, and to Wiener inverse filtering such as is used, for example, in U.S. Pat. No. 3,592,286.

While this invention has been described with specific reference to seismographic exploration, it will be also apparent tht the invention may be applied to any art requiring the additive combination of serial correlations or convolutions of discrete numerical values.

What is claimed is:

1. A method of geophysical exploration comprising:
   introducing into the earth a first vibratory signal,
   detecting its return signal from the earth,
   cross-correlating the return signal with a representation of the first signal, and
   randomly varying the level of the representation of the first signal prior to cross-correlation.

2. The method of claim 1, wherein the level of said representaion is varied within a limited, predetermined range prior to cross-correlation.

3. The method of claim 1, and
   randomly varying the level of the return signal within a limited, predetermined range prior to cross-correlation.

4. The method of claim 2, and
   randomly varying the level of the return signal within a limited, predetermined range prior to cross-correlation.

5. The method of claim 2, wherein the range of levels of said first representation is varied by a ratio substantially equal to two-to-one.

6. The method of claim 3, wherein the range of levels of said return signal is varied by a ratio substantially equal to two-to-one.

7. In a method of signal processing in which a first signal is cross-correlated with a second signal, the improvement comprising:
   randomly varying the level of a representation of the first signal prior to cross-correlation,
   the level of said representation being varied within a limited predetermined range.

8. The method of claim 7, and
   randomly varying the level of the second signal prior to cross-correlation.

9. The method of claim 7, and
   randomly varying the level of the second signal within a limited, predetermined range prior to cross-correlation.

10. The method of claim 7, wherein the range of levels for said first signal is varied by a ratio substantially equal to two-to-one.

11. The method of claim 8, wherein the range of levels for said second signal is varied by a ratio substantially equal to two-to-one.

12. A method of geophysical exploration comprising:
    introducing into the earth a first vibratory signal,
    detecting its return signal from the earth,
    cross-correlating the return signal with the first signal, and
    randomly varying the level of the return signal prior to cross-correlation.

13. In a method of signal processing in which a first signal is cross-correlated with a second signal, the improvement comprising:
    randomly varying the level of the second prior to cross-correlation.

14. The method of claim 1, wherein the representation of the first signal is expressed as a series of floating point digital numbers and the varying step is performed by approximating said first signal by setting the mantissas of said floating point numbers equal to 1.

15. The method of claim 3, wherein the first signal is expressed as a series of floating point numbers and the step of varying the level of the first signal is performed by approximating said first signal by setting the mantissas of said floating point numbers equal to 1.

16. The method of claim 7, wherein the first signal is expressed as a series of floating point numbers and the varying step is performed by approximating said first signal by setting the mantissas of said floating point numbers equal to 1.

17. The method of claim 8, wherein the first and second signals are expressed as a series of floating point numbers and the step of varying the level of the second signal is performed by approximating the second signal by setting the mantissas of said floating point numbers equal to 1.

18. The method of claim 1, and summing a plurality of the resulting cross-correlations.

19. The method of claim 7, and summing a plurality of the resulting cross-correlations.

20. The method of claim 15, wherein the return signal is expressed as a series of flowing point numbers and the step of varying the level of the return signal is performed by approximating said return signal by setting the mantissas of said floating point numbers equal to 1.

21. The method of claim 17, wherein the step of varying the level of said first signal is performed by approximating said first signal by setting the mantissa of said floating point numbers equal to 1.

\* \* \* \* \*